Patented May 20, 1941

2,242,585

UNITED STATES PATENT OFFICE 2,242,585

DIBENZO-ACRIDINES

Erich Lehmann, Priorau, Kreis Bitterfeld, Germany, assignor to General Aniline & Film Corporation, New York, N. Y., a corporation of Delaware No Drawing. Application October 4, 1939, Serial No. 297,865. In Germany October 7, 1938

7 Claims. (Cl. 260—279)

The present invention relates to a process of preparing dibenzo-acridine and the derivatives thereof.

It is already known to use aminodiphenylmethanes for the preparation of acridines. Thus, for instance, the 2.2′-diamino-1.1′-diphenylmethane leads by means of a thermal reaction to a 9.10-dihydro-acridine. Furthermore, monoamines of those diphenylmethanes may be converted into acridines by oxidizing them. Finally, benzylaniline may be transformed into acridine by oxidation. All the known processes, however, have the drawback to produce the final-products only in poor yields, there is to be cited none, which would have come to industrial importance.

Now, I have found that dibenzo-acridine and the derivatives thereof may be prepared in a simple manner and with quantitative yields by causing 2.2′-dihydroxy-1.1′-dinaphthylmethane and the carboxylic acids thereof to react, under pressure and at an elevated temperature with aqueous solutions of ammonia or primary aliphatic amines, as for instance, methylamine, ethanolamine or butylamine, and by dehydrogenizing, if necessary, in known manner, the 9.10-dihydrodibenzo-acridines obtained, which correspond to the general formula

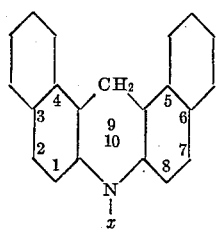

wherein $x$ means hydrogen, alkyl or hydroxyalkyl.

The following examples serve to illustrate the invention, but they are not intended to limit it thereto:

Example 1.—200 parts of 2.2′-dihydroxy-1.1′-dinaphthylmethane are heated for 12 hours with 150 parts of ammonia of 30 per cent. strength to 160° C. to 180° C. in a pressure vessel. The reaction product obtained is freed from ammonia and water and recrystallized from alcohol. 160 parts of 9.10-dihydrodibenzo-acridine are obtained which are oxidized in the usual manner in order to form the dibenzo-acridine.

Example 2.—218 parts of 2.2′-dihydroxy-1.1′-dinaphthylmethane - 3.3′ - dicarboxylic acid are heated in a pressure vessel for 18 hours with 300 parts of ammonia of 30 per cent. strength to 260° C. to 270° C. The reaction product is freed from ammonia by heating it, then stirred with dilute caustic soda solution and filtered with suction. The suction residue contains 165 parts of the dicarboxylic acid amide of the dihydroacridine, which may be oxidized after saponification to dicarboxylic acid, in the usual manner, so as to form the dibenzo-acridine-dicarboxylic acid.

Example 3.—149 parts of 2.2′-dihydroxy-1.1′-dinaphthylmethane are heated for 10 hours with 300 parts of methylamine of 40 per cent. strength in a pressure vessel to 245° C. to 250° C. The reaction product is freed from the excess of methylamine by distillation with steam and the product remaining in the flask is boiled with 2 n-caustic soda solution for removing the starting material present in unaltered condition. 120 parts of N-methyl-10-hydrodibenzo-acridine are obtained.

Example 4.—149 parts of 2.2′-dihydroxy-1.1′-dinaphthylmethane are heated for 10 hours with 300 parts of n-butylamine of 50 per cent. strength to 250° C. to 260° C. The whole is worked up as indicated in Example 3. 125 parts of the N-butyl-derivative of the 9.10-dihydrodibenzo-acridine are obtained.

Example 5.—149 parts of 2.2′-dihydroxy-1.1′-dinaphthylmethane are heated for 10 hours in a pressure vessel with 280 parts of mono-ethanolamine of 40 per cent. strength to 255° C. to 260° C. The further treatment is effected as described in Example 3. 120 parts of the N-hydroxy-ethyl-derivative of the 9.10-dihydrodibenzo-acridine are obtained.

The acridines are bactericides per se; they may be used, however, likewise as intermediate products for other pharmaceutical products or for dyes.

What I claim is:

1. The process for manufacturing dibenzo-acridines and the carboxylic acids thereof, which comprises heating a member of the group consisting of 2.2′-dihydroxy-1.1′-dinaphthylmethane and the carboxylic acids thereof under superatmospheric pressure with an aqueous solution of a compound of the group consisting of ammonia and primary aliphatic amines to the reaction temperature.

2. The process which comprises heating 2.2'-dihydroxy-1.1'-dinaphthylmethane with an aqueous solution of ammonia in a closed vessel to about 160° C. to about 180° C. and oxidizing the reaction product to form the desired dibenzoacridine.

3. The process which comprises heating 2.2'-dihydroxy - 1.1' - dinaphthylmethane with an aqueous solution of methylamine in a closed vessel to about 245° C. to about 250° C.

4. The process which comprises heating 2.2'-dihydroxy-1.1'-dinaphthylmethane with an aqueous solution of monoethanolamine in a closed vessel to about 255° C. to about 260° C.

5. The dihydro-acridines which correspond to the general formula

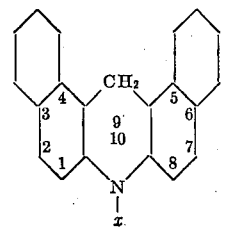

wherein $x$ is a member of the group consisting of alkyl and hydroxyalkyl.

6. N - methyl-3.4,5.6-dibenzo-9.10-dihydroacridine.

7. N - hydroxyethyl - 3.4,5.6 - dibenzo - 9.10-dihydroacridine.

ERICH LEHMANN.